United States Patent [19]

Thomas

[11] Patent Number: 4,664,801
[45] Date of Patent: May 12, 1987

[54] FILTER CARTRIDGE SEALING COMPOSITION AND PROCESS THEREFOR

[75] Inventor: Dwight J. Thomas, Poway, Calif.

[73] Assignee: Brunswick Corporation, Skokie, Ill.

[21] Appl. No.: 727,290

[22] Filed: Apr. 25, 1985

Related U.S. Application Data

[63] Continuation of Ser. No. 545,602, Oct. 27, 1983, abandoned, which is a continuation of Ser. No. 337,863, Jan. 7, 1982, abandoned.

[51] Int. Cl.$^4$ .............................................. B01D 13/00
[52] U.S. Cl. .................................. 210/489; 210/493.2
[58] Field of Search ................. 210/493.2, 497.01, 489

[56] References Cited

FOREIGN PATENT DOCUMENTS 757121 10/1970 Belgium ........................... 210/493.2

*Primary Examiner*—Frank Spear
*Attorney, Agent, or Firm*—Paul T. Meiklejohn; John G. Heimovics; Art Greif

[57] ABSTRACT

End capping a filter cartridge. The filter cartridge contains a hollow central core for passage of fluid, a membrane around the central core through which the fluid also passes, at least one support for the membrane in intimate contact with the membrane, a cage for holding the membrane and the support in contact with the central core, and an end cap for sealing the cartridge. This method comprises (a) allowing a first resin, such as polyurethane, to cure within the end cap until a viscosity of from about 200,000 to about 3,000,000 cps is achieved, (b) placing a second resin, which has a viscosity of from about 1,500 to about 20,000 cps, on top of the first resin such that an interface is formed between the resins, (c) placing the membrane, support, core, and cage to such a depth within said end cap that they penetrate within the second resin, (d) allowing the second resin to penetrate the capillaries of the membrane and support, (e) placing the membrane, support, core, and cage through the first resin prior to the gelation of the first resin, and (f) allowing the resins to completely cure and effectively seal the filter cartridge.

5 Claims, 2 Drawing Figures

U.S. Patent May 12, 1987 4,664,801
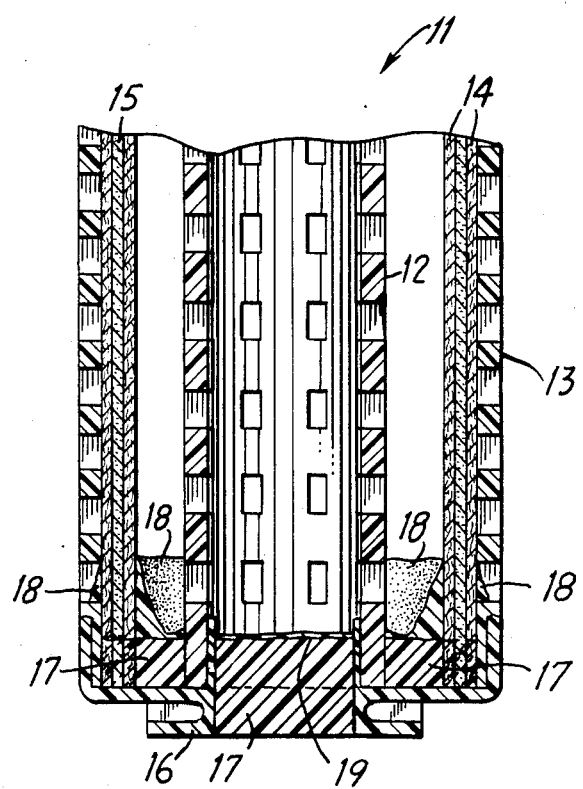
FIG. I
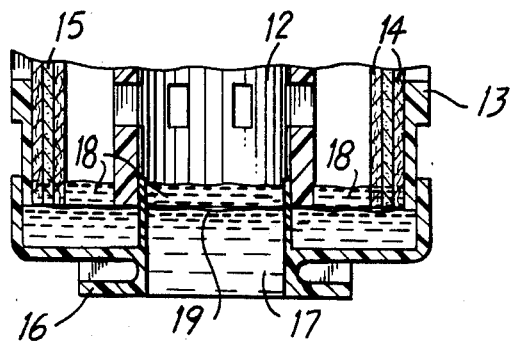
FIG. II

FILTER CARTRIDGE SEALING COMPOSITION AND PROCESS THEREFOR

This is a continuation of application Ser. No. 545,602, filed on Oct. 27, 1983 which was a continuation application Ser. No. 337,863 filed on Jan. 7, 1982, both now abandoned.

BACKGROUND OF THE INVENTION

1. Field of Invention

This invention relates generally to filter cartridges which contain membranes which are useful in separating materials. More particularly, this invention relates to processes and compositions which are used to end cap a filter cartridge.

2. Description of the Prior Art and More Particular Background

Polymeric membranes are well known. These membranes may generally be classified according to their retentivity, i.e., the sizes of particles which they retain, or according to their effective pore size, as either ultrafilter membranes, which have the finest pores, or microporous (or microfilter) membranes, which have coarser pores. The dividing line between ultrafilter membranes and microfilter membranes is between approximately 0.025 and 0.050 micrometers in pore size or smallest retained particle.

Membranes may also be classified according to the porosity difference or similarity of their two faces. Thus, membranes may be classified as symmetrical when the two faces have similar porosity, or as asymmetrical when the two faces differ in porosity.

An important characteristic of a membrane is its permeability to water which is measured by the volume of pure water which passes through a unit area of membrane per unit time. Water permeability is customarily expressed in units of cm/min-psi which represents the macroscopic velocity in cm/min at which water flows through the membrane when the driving pressure is one psi.

The flow of water through the membrane is, within wide limits, directly proportional to the applied pressure. In general, the permeability to water decreases as the retentivity of the membrane to solutes increases, because smaller pores offer more resistance to flow. This relationship, however, is not a simple one since the retentivity depends on the single smallest pore encountered by the liquid in passing through the membrane, whereas the resistance to flow depends on the cumulative effect of all the pores through which this liquid must pass. Hence, membranes of similar solute retention having uniform pores throughout their entire thickness have lower permeabilities than those whose retentivity is due to a thin skin having the same pore size combined with a body or substrate of much larger pores. In other words, symmetrical membranes offer more resistance to fluid flow and therefore have slower flow rates compared to asymmetrical membranes of similar retentivity.

In addition to their retention characteristics, membranes may be characterized by their ability to resist plugging or their dirt-holding capacity. Plugging refers to a reduction of the filtration rate during the filtering operation as a function of the amount of liquid passing the membrane. In order to extend the lifetime of a membrane in a given filter operation, it is customary to pre-filter the fluid through a membrane or filter having higher flow rates and lesser retentivities, but still the ability to reduce severe fouling, or blocking, of the final membrane filter.

Structurally, membranes vary greatly and may generally be classified as either reticulated or granular. In the former, there is a three-dimensional open network of interconnecting fibrous strands and open interstitial flow channels. In the granular type structure, however, incompletely coalesced solid particles called granules leave an interconnected network of pores between them. Reticulated membrane structures generally have a higher porosity than granular membrane structures. (Porosity of membranes is defined as (1 − the relative density). Porosity is also defined as the ratio of the weight of a given volume of membrane to that of the bulk polymer forming the membrane.)

Polymeric membranes are generally made by preparing a solution of the polymer in a suitable solvent, forming the solution into a thin sheet, a hollow tube or hollow fiber, and then precipitating the polymer under controlled conditions. Precipitation may be carried out by solvent evaporation or by contacting the polymer solution with a nonsolvent.

U.S. Pat. No. 3,615,024 discloses a method of forming porous polymeric membranes which are described as being highly asymmetric. The membranes produced according to that method are only slightly asymmetric, however, and have a permeability to water which is only slightly higher than that of symmetrical membranes of the same retentivity.

Membranes may also be classified as composite, supported or integral. Composite membranes comprise a very thin retentive layer attached to a preformed porous support. In a supported membrane, the actual membrane is attached to a strong sheet material of negligible retentivity. Integral type membranes are formed in one and the same operation having layers of the same composition. These layers may have very different properties, depending, in general, on whether the membrane is symmetrical or asymmetrical.

The membrane is supported by a support layer and both are wrapped around a central core of the cartridge such that a fluid which contains particles passes through the core, support, and membrane. The membrane allows the fluid to pass through, but retains the particles. An outer cage holds the membrane and the support to the central core.

At the end of the filter cartridge is a cap—a so-called "end cap" which is used to seal the cartridge against leaks. The filter cartridge may be "end capped" by applying a potting compound or adhesive to the end cap and immersing the cartridge elements (central core, membrane, support, and outer cage) into the adhesive. When the adhesive dries, the cartridge is theoretically sealed.

Problems develop in practice, however. If a low viscosity resin were to be used as the potting compound or adhesive, the resin tends to wick or rise up through the capillaries of the membrane and support and create voids under the pack and loss of initial integrity of the cartridge or loss of integrity after the cartridge is autoclaved (as it must be for certain applications). Furthermore, if the potting compound or adhesive has too high a viscosity, there results insufficient wicking and sharp interfacial transitions which cause both initial and post-autoclave failures.

The problems of excessive wicking and the resulting voids under the pack is particularly severe in the case of asymmetric membranes which contain a comparatively high amount of large pores in the side of the membrane opposite the skin. The low viscosity resin is more susceptible to wicking through these large pores than it would be through a relatively more dense symmetric membrane.

The search has continued for improved processes for end capping filter cartridges and for improved potting compositions. This invention was made as a result of that search.

OBJECTS AND SUMMARY OF THE INVENTION

Accordingly, it is a general object of the present invention to avoid or substantially alleviate the above discussed problems of the prior art.

A more specific object of the present invention is to provide a process for end capping a filter cartridge so as to avoid the presence of voids under the pack and loss of integrity of the filter cartridge either initially or after autoclaving.

Another object of this invention is to provide an improved potting composition for end capping a filter cartridge.

Still another object of the present invention is to provide a process for filtering fluids using the filter cartridge which has been end capped by this process using this potting composition.

Other objects and advantages of the present invention will become apparent from the following summary of the invention and description of its preferred embodiments.

The present invention provides, in one aspect, a process of end capping a filter cartridge. The cartridge contains a hollow central core for passage of a fluid, a membrane around said central core through which the fluid also passes, at least one support for the membrane in intimate contact with the membrane, a cage for holding the membrane and the support in contact with the central core, and an end cap for sealing the cartridge. This method comprises (a) allowing a first resin to cure within the end cap until a viscosity of from about 200,000 to about 3,000,000 cps is achieved; (b) placing a second resin which has a viscosity of from about 1,500 to about 20,000 cps on top of the first resin such that an interface is formed between the resins; (c) placing the membrane, support, core, and cage to such a depth within the end cap that they penetrate within the second resin up to the interface between the resins; (d) allowing substantially all of the second resin to penetrate the capillaries of the membrane and support; (e) placing the membrane, support, core, and cage through the first resin to the bottom of the end cap prior to the gelation of the first resin; and (f) allowing the resins to completely cure and effectively seal the filter cartridge. The resins are each compatible with, and cure at a temperature below the decomposition temperature of, the membrane, the support, and the end cap.

The present invention, in another aspect, also provides a composition useful for sealing the membrane and its support to the end cap of the filter cartridge. This composition comprises the resins described above.

In yet another aspect, the present invention provides a process for filtering a fluid which contains particles to be removed from that fluid. This process comprises passing the fluid through a filter cartridge which has been end capped by the above-described process using the above-described potting composition.

BRIEF DESCRIPTION OF THE DRAWING

FIG. I is a side view of a filter cartridge end capped in accordance with the process of the present invention using the composition of the present invention.

FIG. II is a side view of the filter cartridge of FIG. I at a point in time when the cartridge elements are immersed only to the interface between the resins.

DESCRIPTION OF THE PREFERRED EMBODIMENTS

The present invention provides, in one aspect, a composition useful for sealing a membrane and its support to the end cap of a filter cartridge. The composition comprises a first resin which has a viscosity of generally from about 200,000 to about 3,000,000, typically from about 1,000,000 to about 2,500,000, and preferably from about 1,500,000 to about 2,000,000 cps. This first resin has the purpose of creating a solid bed of resin which gaskets the filter pack end and provides adhesion to the end cap, cage, and central core for structural integrity.

A first resin having a viscosity substantially in excess of about 3,000,000 cps should not be used, since such a counpound would be, in essence, a gel and would no longer possess the ability to effectively seal the membrane to the end cap. Furthermore, first resins having viscosities substantially less than about 200,000 cps should not be used since such a low viscosity composition would tend to wick or rise from the end cap up through the membrane and support by a kind of capillary action. This removal of this resin from the end cap where it is needed to perform its sealing function may result in the presence of voids under the membrane pack and loss of integrity either immediately or after autoclaving.

The composition of the present invention also contains a second resin which has a viscosity of generally from about 1,500 to about 20,000, typically less than about 10,000, and preferably less than about 1,500 cps. This low viscosity resin is readily drawn by capillary action into the composite filter pack, thus reinforcing the filter pack to some height above the initial potting compound and providing a flexible interface between the compressible filter pack and the rigid end cap/potting structure.

A second resin having a viscosity substantially in excess of about 20,000 cps should not be used since such a high viscosity resin would not wick sufficiently (or at all depending upon the viscosity of the resin) to provide the reinforcing function described above. A resin having a viscosity substantially less than about 1,500 cps should also not be used since this low viscosity material would wick too much and not provide the reinforcing function for the filter cartridge near the end cap where it is most needed.

The first resin may be either a thermosetting or a thermoplastic polymer. Suitable thermosetting polymers are polyurethanes, epoxies, polyamides, and phenolics. Suitable thermoplastic polymers are polyamides, polyesters, and polypropylene. A preferred first resin is polyurethane, particularly Biothane System 237 polyurethane which has been allowed to cure to the appropriate viscosity. Biothane System 237 polyurethane is commercially available from NL Chemicals in Hightstown, N.J. Mixtures of two or more first resins may also be used.

The second resin should be one of the thermosetting compounds set forth hereinabove, preferably the Biothane System 237 polyurethane at the appropriate viscosity because this polyurethane is elastomeric and will not crack and thus cause voids due to mechanical forces after it has cured.

The resins may each preferably have the same chemical composition and each is preferably the Biothane System 237 polyurethane described above, except, of course, each of the resins is at a different viscosity.

The resins should be compatible with the membrane, its support, and the end cap. Accordingly, if the membrane is made of polysulfone which is hydrophyllic, the resins should also be hydrophyllic. Thus, polyurethane may be used as the resins with a polysulfone membrane.

Both resins must cure at a temperature below the decomposition temperature of the membrane, the support, and the end cap and the curing takes place preferably within a reasonable amount of time. Furthermore, both resins must be autoclaveable, i.e., they must be able to withstand 30 psi steam or the equivalent of 130° C. because the filter cartridges are sterilized in line by live steam or by autoclaving.

The composition of the present invention may be used in a filter cartridge as illustrated in FIG. I. Filter cartridge 11 contains central core 12 which has membrane 15 wrapped around it. This membrane 15 is supported by support layers 14 which is preferably a non-woven polyester. Remay non-woven polyester is particularly preferred for use in the present invention.

Membrane 15 with its support layers 14, is held to core 12 via cage 13. The housing of filter cartridge 11, including core 12 and cage 13, may be made of any material, but is preferably made of polysulfone, polypropylene, or polyester. When the membrane is made of polysulfone, polysulfone is preferably used as the cartridge material.

Filter cartridge 11 also contains end cap 16 at the bottom of cartridge 11 which seals cartridge 11 by bonding together membrane 15, support layers 14 and cage 13 to end cap 16.

The present invention also provides a process of end capping, or effectively sealing, filter cartridge 11. This process includes a first step of allowing first resin 17 to cure within end cap 16 until a viscosity of from about 200,000 to about 3,000,000 cps is achieved. The time and temperature needed to cure this first resin to the appropriate viscosity is dependent upon the particular resin employed. These conditions should, however, be such that curing is fast enough to be economically feasible but not so fast that gelation takes place prior to immersion of all the filter cartridge components for sealing. For the preferred polyurethane resin of the present invention, the curing time is generally from about 70 to about 120, typically from about 80 to about 105, and preferably from about 85 to about 95 minutes at a temperature of generally about 70 to about 80, and preferably from about 72° to about 76° F. The cure temperature must be lower than the decomposition temperature of the membrane, support layer, end cap, and cage.

Second resin 18 is then placed on top of first resin 17 such that an interface 19 is formed between the resins, resulting from the viscosity difference between the resins. The resins may have different chemical compositions but first and second resins having the same chemical composition are preferred.

The membrane, support layer, core, and cage are then placed to such a depth within the end cap that they penetrate within the second resin up to the interface between the resins. At this point substantially all of the second resin penetrates the capillaries of the membrane and support. The time needed for penetration of substantially all of the second resin through the capillaries of the membrane and support may vary widely and depends upon the particular resin employed but the time is generally from about 1 minute to about 7 days, typically from about 5 hours to about 3 days, and preferably from about one to about two days.

The amount of each resin may vary widely. The total amount of both resins should be generally from about 15 to about 25, typically from about 17 to about 23, and preferably from about 19 to about 21 grams. The ratio of the weight of the first resin to that of the second may vary from about 60:40 to about 40:60 but a substantially equal weight ratio is preferred.

Using the above amounts of first and second resin in a standard filter cartridge, it is necessary to immerse the membrane, support layer, core and cage only to the interface of the resins until substantially all of the second resin has penetrated the membrane and the support. If these cartridge elements are immersed through both resins to the bottom of the end cap in a single step, there will occur an overflow of resin from the end cap.

Only after substantially all of the second resin has penetrated the membrane and the support are the core, cage, membrane, and support placed through the first resin layer to the bottom of the end cap. This step must take place prior to gelation of the first polymer or else effective sealing will not take place.

The resins are then allowed to cure and effectively seal the cartridge materials to the end cap.

FIG. II shows resins 17 and 18 immediately prior to immersion of the cartridge elements into resin 17. FIG. I shows resins 17 and 18 after immersion of the cartridge elements to the bottom of end cap 16.

This process simultaneously solves both problems which arise from using a low viscosity or a high viscosity resin alone to end cap a filter cartridge. While the low viscosity resin of the present invention does wick from the end cap area, voids under the pack and loss of integrity do not occur because of the presence of the high viscosity resin. While the high viscosity resin of the present invention does not wet the membrane, the membrane is wetted by the low viscosity polymer, thus avoiding initial and post-autoclave failures.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in this art without departing from the spirit of the invention.

I claim:
1. A filter cartridge comprising:
(a) end cap means having a reservoir cavity with a bottom surface;
(b) cartridge elements comprising in concentric alignment:
a central core,
an elongated porous membrane structure for filtering liquid passing therethrough,
elongated porous support means for the membrane structure, and
an outer cage,
the cartridge elements having end portions at each end of their elongated structure;

(c) an end portion of the cartridge element being embedded in a first resin adhesive in the cavity adjacent the bottom surface of the cap means and secured thereto, the adhesive having a viscosity ranging from about 200,000 to 3,000,000 cps prior to setting;

(d) a second resin adhesive located in the cavity on top of the first adhesive, the second adhesive having a viscosity of from about 1,500 to 20,000 cps prior to curing;

(e) substantially all the capillaries at the endmost portions of (1) the membrane structure and (2) the support means being penetrated and sealed with the second adhesive, as a result of having been previously embedded in the second adhesive for a period sufficient to permit such penetration and sealing; and (f) the first adhesive compatible with and bonded to the second adhesive and to the impervious edges formed by the second adhesive in conjunction with the end portions of the membrane structure and the support means, the resins of the adhesives having setting temperatures below the decomposition temperatures of the cap means and the filter media.

2. The cartridge of claim 1 wherein said first resin is a member selected from the group consisting of thermoplastic and thermosetting resins and said second resin is a thermosetting resin.

3. The cartridge of claim 1 wherein each of said adhesive resins has the same chemical composition.

4. The cartridge of claim 3 wherein said resins are both polyurethane.

5. The cartridge of claim 1 wherein said first resin is a member selected from the group consisting of polyurethane, polyepoxies, polyamides, phenolics, thermoplastic polyesters and polypropylene and said second resin is a polyurethane.

* * * * *